United States Patent [19]

Teuber

[11] Patent Number: 4,670,809

[45] Date of Patent: Jun. 2, 1987

[54] DOOR HINGE FOR A VIDEOCASSETTE

[75] Inventor: Vincent P. Teuber, Hastings, Minn.

[73] Assignee: Minnesota Mining and Manufacturing Company, St. Paul, Minn.

[21] Appl. No.: 746,371

[22] Filed: Jun. 19, 1985

[51] Int. Cl.⁴ ............................................. G11B 23/02
[52] U.S. Cl. .................................... 360/132; 220/337; 242/199
[58] Field of Search ................ 360/132; 242/199, 197, 242/198, 200; 206/387; 220/334–335, 326, 337

[56] References Cited

U.S. PATENT DOCUMENTS 3,809,219  5/1974  Esashi ............................... 220/55 K
4,130,221 12/1978  Peterson .............................. 220/326

Primary Examiner—A. J. Heinz
Attorney, Agent, or Firm—Donald M. Sell; James A. Smith; David W. Anderson

[57] ABSTRACT

A hinge assembly for an access door of a videocassette is formed of intergral interlocking projections of the housing and the door, which projections are grooved to accept a straight portion of a torsion spring and thereby provide a knuckle joint of the hinge assembly.

4 Claims, 4 Drawing Figures

DOOR HINGE FOR A VIDEOCASSETTE

BACKGROUND OF THE INVENTION

1. Field of the Invention

This invention relates to a hinge joint for the access door of a videocassette of the type used in a video recording and playback machine and, more particularly, a hinge joint for the door of a "U-Matic" cassette developed by Sony Corporation.

2. Description of the Prior Art

As is best seen in FIG. 2 of U.S. Pat. No. 3,809,219, a prior art video tape cassette or videocassette 10 typically comprises a length of magnetizable recording tape 19, two reels 17 and 18 each supporting a different helically-wound end portion of the length of tape 19, and a generally rectangular housing 11 enclosing and supporting the reels 17 and 18 for rotation to transfer tape 19 between the reels 17 and 18. The housing 11 includes an outer front wall having generally planar end portions and a recessed portion 16 defining a tape access area along the outer surface of the housing 11, and guide pins 20 and 21 for guiding tape between the reels 17 and 18 through the outer wall and across the recessed portion 16 to afford access thereto by the mechanism 62 of a video tape recording/playback machine. A door 22 is pivotally mounted on the housing 11 by a hinge assembly 23, 24 for movement between a closed position over the length of tape 19a extending through the tape access area (FIG. 5) and an open position (FIG. 1) spaced from the tape access area 16, with the door 22 being biased to its closed position by a helically-wound spring 25 tensioned between the housing 11 and the door 22.

While the use of such a spring 25 is effective in biasing the door 22 to its closed position, it is difficult to assemble to the cassette 10 and thus adds to the cost of the cassette 10.

U.S. Pat. No. 4,130,221 is an improvement over the prior cassette described above in that the helically-wound spring is eliminated and replaced by a torsion spring which operates as a hinge pin in addition to biasing the cassette door to its closed position. The cassette 50 of U.S. Pat. No. 4,130,221 includes a metal door 54 which has two rolled, cylindrical projections 74 which mate with a rolled, cylindrical projection 76 of a hinge plate 70 to form the knuckle joint of a hinge for the door 54. The torsion spring 52 passes through the rolled portions 74 and 76 of the door 54 and 70, respectively, to provide a hinge pin and includes end portions 80 and 82 attached to the door 54 and the hinge plate 70, respectively, which operate to bias the door 54 into its closed position.

The torsion spring of U.S. Pat. No. 4,130,221 is effective to simplify the biasing mechanism for the door 54, but the metal door 54, and particularly its rolled, knuckle joint portions 74, is difficult to fabricate and attachment of the hinge plate 70 to the cassette 50 requires assembly time and thus adds to the cost of the cassette 50.

SUMMARY OF THE INVENTION

According to the present invention there is provided an improved knuckle joint for the hinge connecting an access door to a videocassette housing, which knuckle joint is formed by integral projections molded with the door and the housing of the videocassette. The improved knuckle joint of the hinge according to the present invention accepts a torsion spring of the type described above with respect to U.S. Pat. No. 4,130,221, and includes at least one projection extending from the housing toward the door and including a longitudinal groove for accepting a straight central portion of the torsion spring; at least one projection extending from the door toward the housing and including a longitudinal groove for accepting the straight central portion of the torsion spring, with the grooves in the housing projection and the door projection being aligned to permit passage of the spring central portion so that the housing projection and the door projection form the knuckle joint of a hinge permitting rotation of the door relative to the housing and around the torsion spring central portion; and means for retaining the torsion spring central portion within the grooves in the housing projection and the door projection. The preferred means for retaining the torsion spring is a heat-deformed portion of the housing and door projections which surround the torsion spring.

BRIEF DESCRIPTION OF THE DRAWINGS

The present invention will be further described with reference to the accompanying drawings, wherein like numbers refer to like parts in the several views, and wherein.

DESCRIPTION OF THE PREFERRED EMBODIMENT

Figure 1:
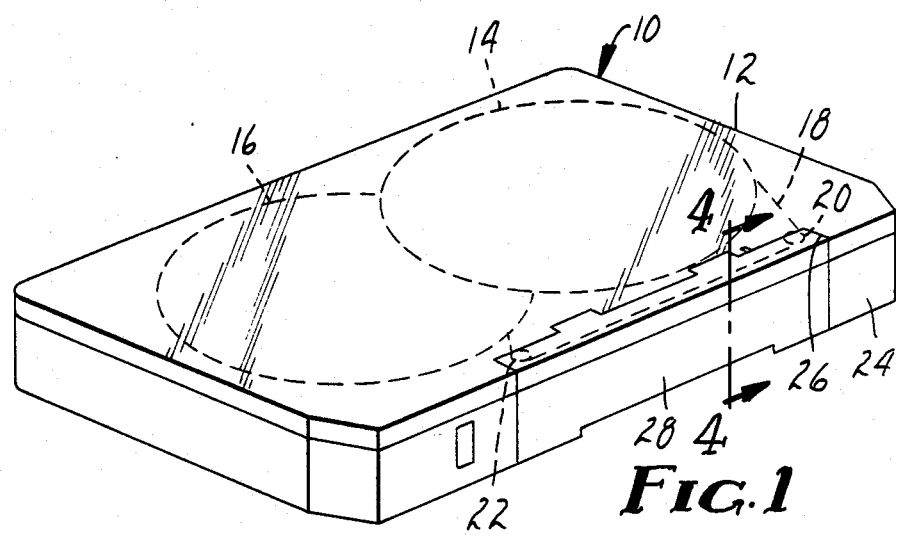
FIG. 1 is a perspective view of a videocassette according to the present invention.
Figure 2:
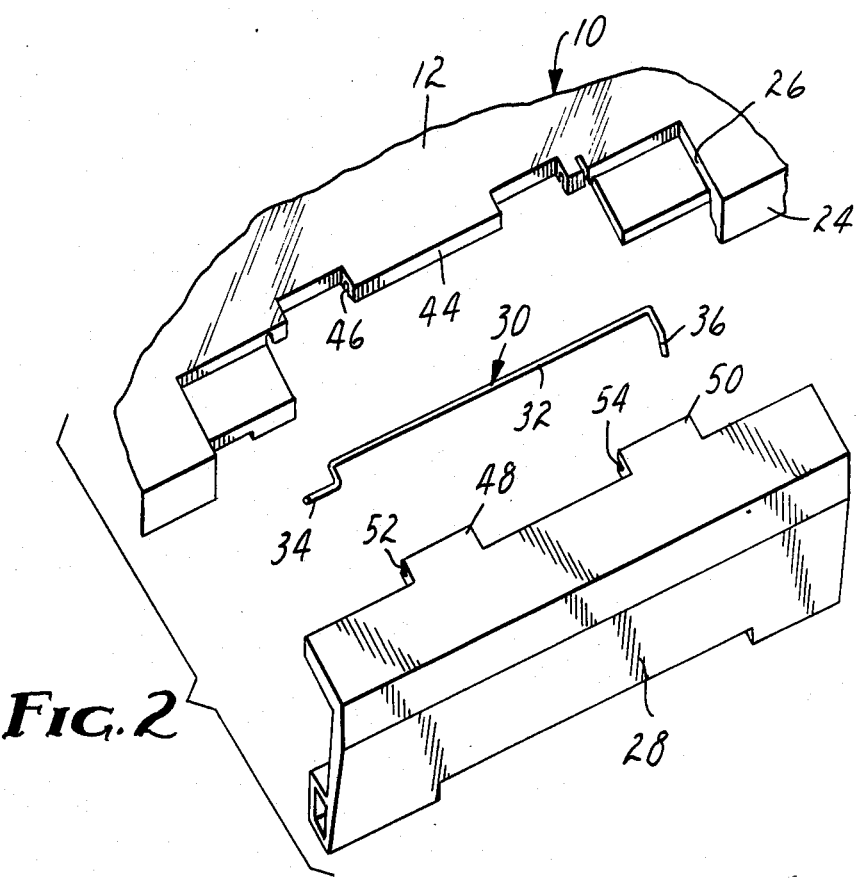
FIG. 2 is an exploded perspective view of an access door, a torsion spring and a portion of a housing forming the videocassette of FIG. 1.

Referring now to the drawings, there is illustrated a video tape cassette, or videocassette, 10 which includes a housing 12, preferably molded of a polymer, which encloses two reels 14 and 16 upon which is helically wound a magnetizable tape 18 which may be transferred between the reels 14 and 16 by rotation thereof. The tape 18 is directed by tape guides 20 and 22 parallel to the front face 24 of the housing 12. The front face 24 of the housing 12 includes a recess 26 which permits access of the tape 18 by an external recording and playback machine (not shown). This recess 26 is closed by a door 28 when the videocassette 10 is not in use, to prevent contamination of the tape 18. The door 28 and the housing 12 are preferably molded of a polymeric material, although other materials and/or forming methods could be employed.

Figure 3:
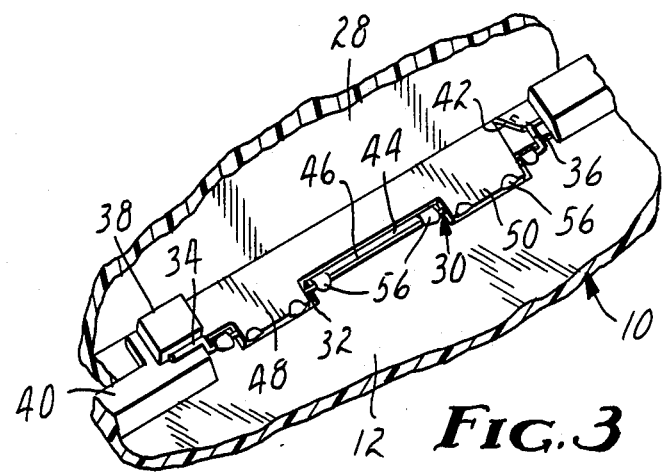
FIG. 3 is a perspective view of the components of FIG. 2 in an assembled condition, taken from a reverse, or inside, perspective with respect to FIG. 2.
Figure 4:
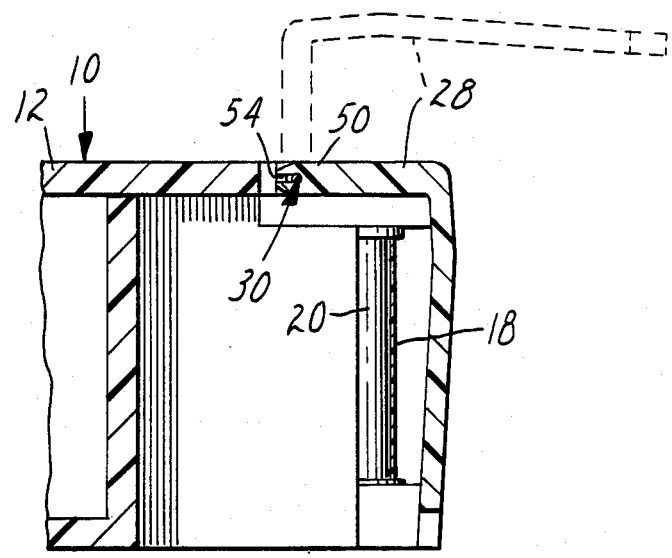
FIG. 4 is a partial cross-sectional view of the housing and the door taken generally along the line 4—4 of FIG. 1.

The door 28 is biased to the closed position shown in FIG. 1 by a metal torsion spring 30 which includes a long, straight central portion 32 and bent ends 34 and 36. The bent ends 34 and 36 are generally oriented at an angle of 90° with respect to the straight central portion 32, and, as best seen in FIG. 3, the end 34 is captured by a protrusion 38 which extends from the inner surface 40 of the housing 12. The remaining end 36 of the torsion spring 30 is captured by a pocket 42 molded into the door 28. As the door 28 is opened, the ends 34 and 36 rotate relative to each other to torsionally wind the central portion 32 and thus create a biasing force tending to close the door 28.

To provide a hinge between the housing 12 and the door 28, the housing 12 is provided with a projection 44 which includes a molded longitudinal groove 46 for accepting the straight, central portion 32 of the torsion spring 30. The door 28 is provided with two projections 48 and 50, each of which includes a longitudinal groove 52 and 54, respectively, which likewise accept the straight, central portion 32 of the torsion spring 30. When the door 28 is assembled to the videocassette enclosure 12, the door projections 48 and 50 straddle the housing projection 44 and are aligned in such a manner that the bottom of the door projection grooves 52 and 54 are aligned with the bottom of the housing projection groove 46. Assembly of the door 28 to the videocassette enclosure 12 is accomplished by positioning the straight, central portion 32 of the torsion spring 30 within the housing projection groove 46 and assembling the door to the videocassette housing 12 such that its projection grooves 52 and 54 contain those portions of the torsion spring 30 which extend beyond the ends of the housing projection groove 46. In this fashion the housing projection 44 and the two door projections 48 and 50 form interlocking portions of the knuckle joint of a hinge which are connected by the straight, central portion 32 of the torsion spring 30 which operates as a hinge pin.

Permanent attachment of the torsion spring 30 to the housing 12 and the door 28 to the torsion spring 30 is accomplished as is best seen in FIG. 3 by deformations 56 formed in the material of the housing 12 and the door 28 to close the grooves 46, 52 and 54 and capture the torsion spring 30. These deformations 56 are preferably formed in the polymeric material of the door 28 and the housing 12 by ultrasonic staking. If the material of the door 28 and the housing 12 is polymeric, the deformations 56 may also be formed by otherwise heat deforming the material at the projections 44, 52 and 54. If the housing 12 and/or the door 28 are formed of a different material, such as metal, the deformations 56 may be produced by simply bending the material.

Although the present invention has been described with respect to only a single embodiment, it is recognized that many modifications will be apparent to those skilled in the art. For example, the number of projections may be decreased to one projection from the door 28 and the housing 12 or increased to any number of interlocking projections, the grooves 46, 52 and 54 could be formed in any face of the projections 44, 48 and 50 which is consistent with convenient assembly, and the grooves 46, 52 and 54 could be closed to capture the spring 30 by an adhesive or an epoxy material which adhered to the polymer of the door 28 and the housing 12 but not the metal of the spring 30. All such modifications falling within the scope and spirit of the appended claims are intended to be included in the present invention.

What is claimed is:

1. In a videocassette comprising a length of magnetizable recording tape; two reels each supporting a different helically wound end portion of said tape; a generally rectangular housing enclosing and supporting said reels for rotation to transfer tape between said reels, said housing including an outer front wall having generally planar end portions, a recessed portion between said end portions and means for guiding tape between said reels through said outer wall and across said recessed portion to provide a tape access area; a door; a hinge assembly for pivotally mounting said door on said housing for movement between a closed position over said tape access area and an open position spaced from said tape access area; and a torsion spring for biasing said door to its closed position and including a straight central portion providing a hinge pin, a first end portion fixed to said door, and a second end portion fixed to said housing, the improvement comprising:
   said housing being molded and having at least one projection integrally molded with and extending from said housing toward said door and including a longitudinal groove for accepting said straight central portion of said torsion spring;
   at least one projection extending from said door toward said housing and including a longitudinal groove for accepting said straight central portion of said torsion spring;
   said groove in said housing projection and said groove in said door projection being aligned to permit passage of said spring central portion so that said housing projection and said door projection form the knuckle joint of said hinge assembly permitting rotation of said door relative to said housing and around said spring central portion; and
   means for retaining said spring central portion within said groove in said housing projection and said groove in said door projection.

2. An improved videocassette according to claim 1 wherein said housing comprises one said projection and said door comprises two said projections spaced to accomodate said housing projection therebetween.

3. An improved videocassette according to claim 1 wherein said door is molded and said at least one projection extending from said door is integrally molded with said door.

4. An improved videocassette according to claim 3 wherein said door and said housing are polymeric and said means for retaining said spring are heat-deformed portions of said housing projection and said door projection which close said grooves.

* * * * *